(12) United States Patent
Iorio et al.

(10) Patent No.: US 8,266,618 B2
(45) Date of Patent: Sep. 11, 2012

(54) GRAPHICS HARDWARE RESOURCE USAGE IN A FULLY VIRTUALIZED COMPUTING ENVIRONMENT

(75) Inventors: Francesco Iorio, Dublin (IE); John Hamill, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 12/275,451

(22) Filed: Nov. 21, 2008

(65) Prior Publication Data

US 2010/0131944 A1    May 27, 2010

(51) Int. Cl.
G06F 9/46        (2006.01)
G06F 9/455       (2006.01)
G06F 15/173      (2006.01)
G06F 3/00        (2006.01)

(52) U.S. Cl. ............... 718/1; 718/104; 709/226; 710/17
(58) Field of Classification Search .................. None
See application file for complete search history.

(56) References Cited

U.S. PATENT DOCUMENTS

| | | | |
|---|---|---|---|
| 7,203,944 B1 * | 4/2007 | van Rietschote et al. | 718/104 |
| 7,788,665 B2 * | 8/2010 | Oshins | 718/1 |
| 7,856,549 B2 * | 12/2010 | Wheeler | 713/1 |
| 7,925,923 B1 * | 4/2011 | Hyser et al. | 714/13 |
| 7,970,903 B2 * | 6/2011 | Oeda | 709/226 |
| 2005/0198632 A1 * | 9/2005 | Lantz et al. | 718/1 |
| 2005/0210158 A1 | 9/2005 | Cowperthwaite et al. | |
| 2006/0146057 A1 | 7/2006 | Blythe | |
| 2007/0198243 A1 * | 8/2007 | Leis et al. | 703/26 |
| 2008/0140866 A1 * | 6/2008 | Corry et al. | 710/8 |
| 2009/0119684 A1 * | 5/2009 | Mahalingam et al. | 719/324 |
| 2009/0300606 A1 * | 12/2009 | Miller et al. | 718/1 |

* cited by examiner

*Primary Examiner* — Jennifer To
*Assistant Examiner* — Abdullah Al Kawsar
(74) *Attorney, Agent, or Firm* — Cantor Colburn LLP; Steven Bennett

(57) ABSTRACT

Methods, systems and computer program products for graphics hardware resource usage in a fully virtualized computing environment. Exemplary embodiments include a method in a virtual data center having a first host and a second host, a graphics hardware resource usage the method including receiving a request for graphics hardware features that are unavailable on the first host, generating a first request to a provisioning broker to migrate a virtual machine residing on the first host to the second host having the graphics hardware features, migrating the virtual machine and a client connection to the second host, generating a second request to the provisioning broker to find a suitable host to which the virtual machine can migrate and migrating the virtual machine to the suitable host.

15 Claims, 3 Drawing Sheets

GRAPHICS HARDWARE RESOURCE USAGE IN A FULLY VIRTUALIZED COMPUTING ENVIRONMENT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field

This invention relates to graphics hardware resources, and particularly to methods, systems and computer program products for graphics hardware resource usage in a fully virtualized computing environment.

2. Description of Background

Currently, information technology (IT) is driving consolidation of computing infrastructures on servers, creating fully virtualized data centers with integrated provisioning facilities. In a fully virtualized data center, servers are configured to run operating systems and applications inside virtual machines on top of a hypervisor software layer, which is a virtual machine monitor or virtualization platform that allows multiple operating systems to run on a host computer at the same time. As several visualization-related workloads require 3D graphics hardware acceleration, it is necessary to provide management and provisioning mechanisms that apply to 3D graphics resources in a virtualized environment, which is a feature not present in the current generation of virtual IT infrastructures.

BRIEF SUMMARY

Exemplary embodiments include a method in a virtual data center having a first host and a second host, a graphics hardware resource usage the method including receiving a request for graphics hardware features that are unavailable on the first host, generating a first request to a provisioning broker to migrate a virtual machine residing on the first host to the second host having the graphics hardware features, migrating the virtual machine and a client connection to the second host, generating a second request to the provisioning broker to find a suitable host to which the virtual machine can migrate and migrating the virtual machine to the suitable host.

Additional embodiments include a virtual data center system, including a first host having a virtual machine, a second host, a provisioning broker communicatively coupled to the first host and the second host, a process for migrating the virtual machine between the first and second hosts, the process having instructions for receiving a request for graphics hardware features that are unavailable on the first host, generating a first request to the provisioning broker to migrate the virtual machine from the first host to the second host having the graphics hardware features, migrating the virtual machine and a client connection to the second host, generating a second request to the provisioning broker to find a suitable host to which the virtual machine can migrate and migrating the virtual machine to the suitable host.

Further embodiments include a computer program product for providing graphics hardware resource usage in a virtual data center having a first host and a second host, the computer program product including instructions for causing a computer to implement a method, the method including receiving a request for graphics hardware features that are unavailable on the first host, generating a first request to a provisioning broker to migrate a virtual machine residing on the first host to the second host having the graphics hardware features, migrating the virtual machine and a client connection to the second host, generating a second request to the provisioning broker to find a suitable host to which the virtual machine can migrate and migrating the virtual machine to the suitable host, once the originally unavailable graphics hardware features are no longer required.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

TECHNICAL EFFECTS

As a result of the summarized invention, technically we have achieved a solution which enables visualization of specialized hardware resources in a computing environment that consolidates computing infrastructures on the server side, creating fully virtualized data centers with integrated provisioning facilities, triggering VM migrations transparently upon application requests for specific hardware support.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Exemplary embodiments include methods, systems and computer program products for maximizing the usage of visualization resources including a software stack capable of detecting the level of 3D graphics acceleration requirements of applications running in a virtual machine, and triggering the dynamic migration of such virtual machine environment to and from server pools that host 3D graphics hardware. In exemplary embodiments, the methods, systems and computer program products described herein enable visualization of specialized hardware resources in a computing environment that consolidates computing infrastructures on the server side, creating fully virtualized data centers with integrated provisioning facilities, triggering VM migrations transparently upon application requests for specific hardware support.

Figure 1:
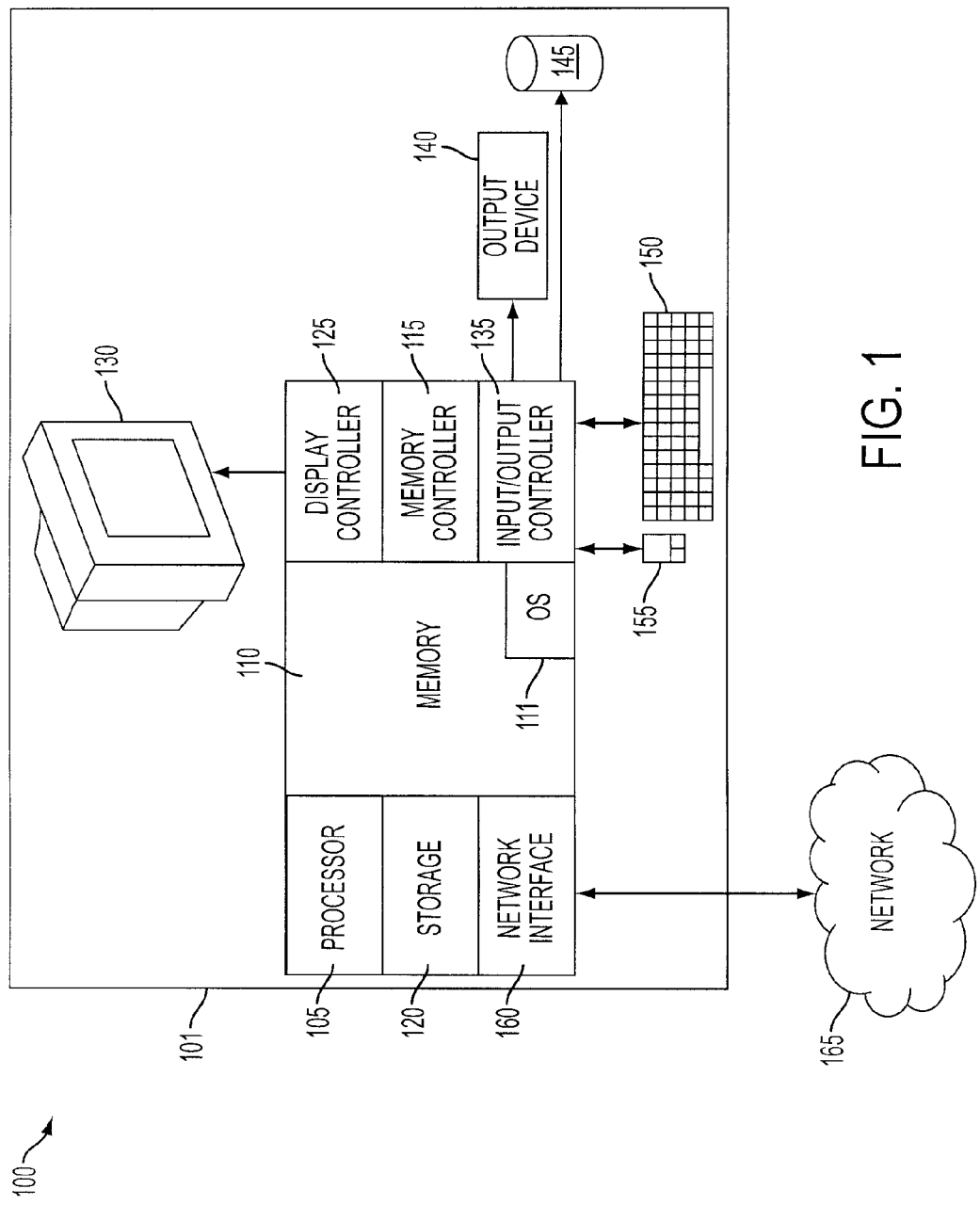
FIG. 1 illustrates an exemplary embodiment of a system for graphics hardware resource usage in a fully virtualized computing environment.

FIG. 1 illustrates an exemplary embodiment of a system 100 for graphics hardware resource usage in a fully virtualized computing environment. The system 100 can be any of the clients and servers described herein in accordance with exemplary embodiments. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the graphics hardware resource usage methods described herein in accordance with exemplary embodiments and a suitable operating system (OS) 111. The operating system 111 essentially controls the execution of other computer programs, such the graphics hardware resource usage systems and methods described herein, and provides scheduling, input-output control, file and data management, memory management, and communication control and related services.

The graphics hardware resource usage methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the graphics hardware resource usage methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the virtual computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is provided by the virtual machine's host hypervisor so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The graphics hardware resource usage methods described herein and the OS 111, in whole or in part, but typically the latter, are read by the processor 105, perhaps buffered within the processor 105, and then executed.

When the systems and methods described herein are implemented in software, as is shown in FIG. 1, the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The graphics hardware resource usage methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the graphics hardware resource usage methods are implemented in hardware, the graphics hardware resource usage methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The general purpose computer described above can be implemented as any one of the servers or clients as now described.

Figure 2:
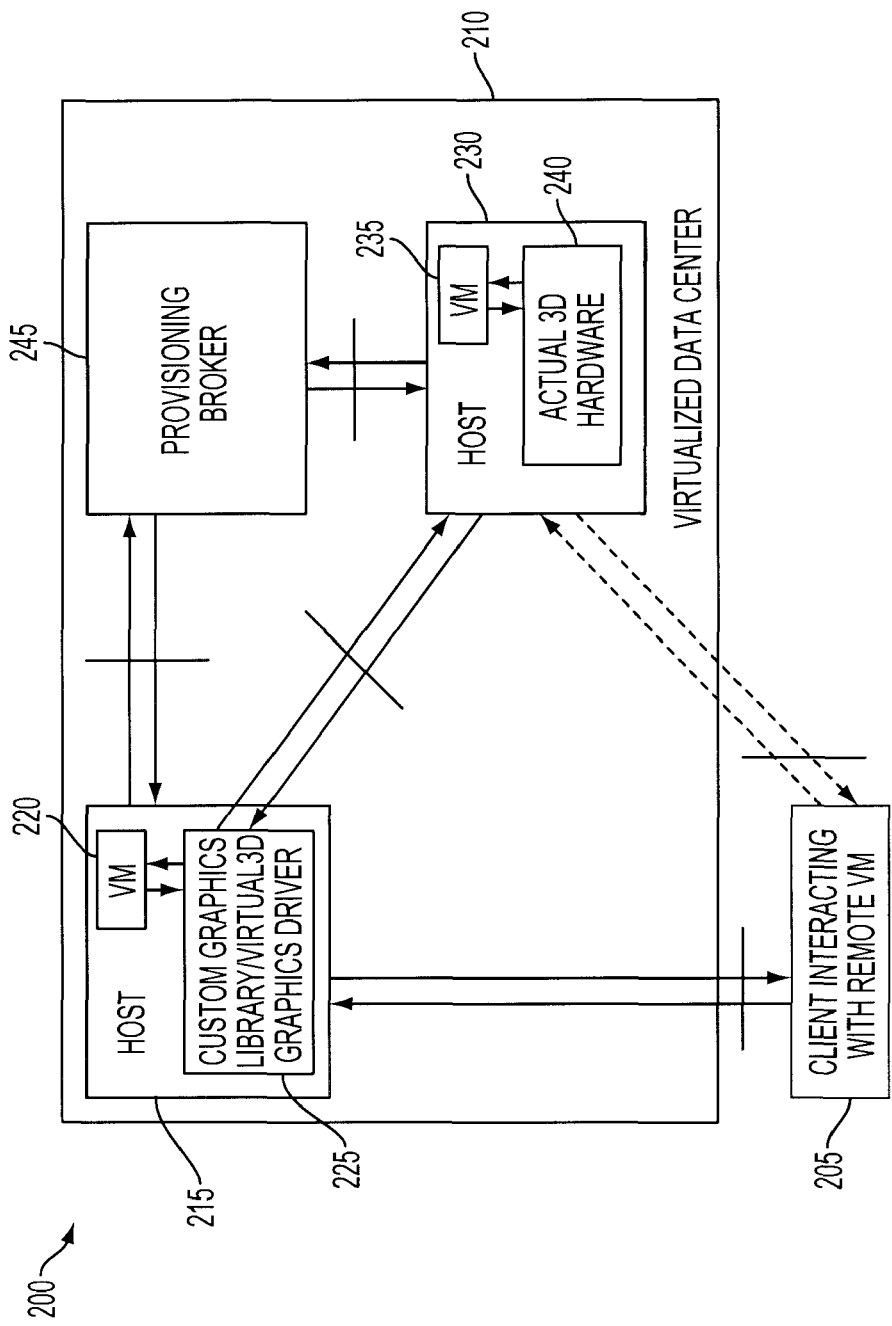
FIG. 2 illustrates an exemplary system for implementing graphics hardware resource usage in a fully virtualized computing environment.

FIG. 2 illustrates an exemplary system 200 for implementing graphics hardware resource usage in a fully virtualized computing environment. In exemplary embodiments, the system 200 can include a client 205 coupled to a virtualized data center 210. The virtualized data center 210 can include a first host 215 having a first virtual machine 220 and a dummy graphics driver 225. The virtualized data center 210 can further include a second host 230 having a second virtual machine 235 and graphics hardware 240 (e.g., 3D graphics hardware). The virtualized data center 210 can further include a provisioning broker 245 coupled to the first host 215 and the second host 230. FIG. 2 illustrates only two hosts, the first host 215 and the second host 230. However, it is appreciated that additional hosts (servers) can be included in the virtualized data center 210.

In exemplary embodiments, in order to maximize the usage of 3D video hardware resources (e.g., the graphics hardware 240), only a small part of the servers in the virtualized data center 210 is equipped with 3D accelerated video hardware (e.g., the second host 230). However, if the client 205 makes a request to the first host 215 requiring use of graphics hardware (e.g., the graphics hardware 240), a custom software stack is created in order to access the graphics hardware 240. In exemplary embodiments, the custom software stack is composed by the dummy graphics driver 225 (e.g., a custom graphics library, supporting an API such as OpenGL or Direct3D and/or a virtual video display adapter driver), and it is included in all the virtual machines 220, 235 running in the fully virtualized data center 210.

In exemplary embodiments, the software stack running inside all the virtual machines 220, 235 intercepts the API/driver calls of any software applications (e.g., from an application running on the client 205) requesting specific 3D hardware acceleration facilities either by intercepting the API calls at the graphics library layer or at the video driver level. When the software stack detects a video hardware acceleration requirement, for example, the software stacks triggers a hypervisor-level call that causes the migration of the involved virtual machine 220, 235 to one of the servers that hosts 3D video hardware (e.g., the second host 230). After the applications using 3D acceleration terminate, the software stack triggers a different hypervisor-level call that releases the virtual machine 220, 235 from the server hosting the 3D graphics hardware (e.g., the graphics hardware 240), and a data center-level load distribution system can reassign the virtual machine 220, 235 to run on a different physical server. It is appreciated that the system 200 supports virtual machines 220, 235 running various operating systems.

Figure 3:
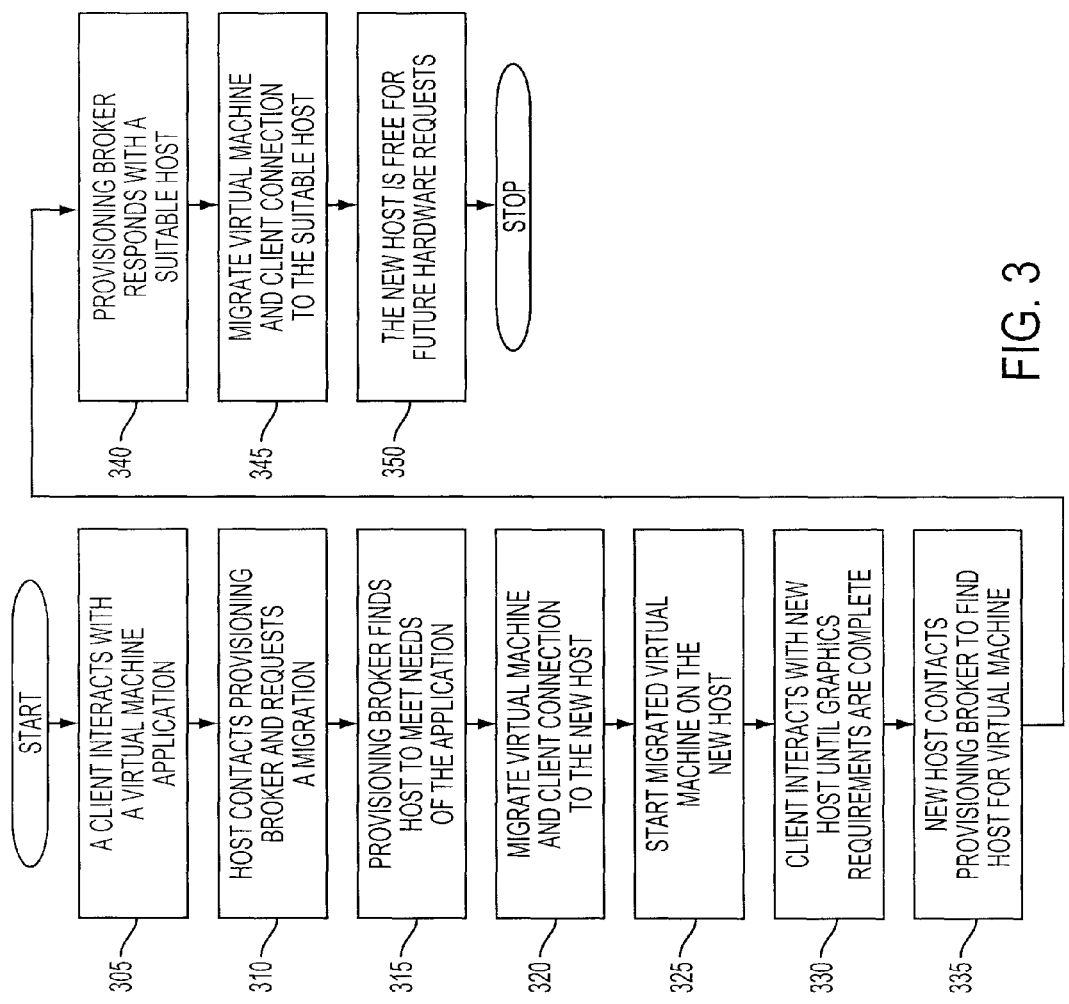
FIG. 3 illustrates a flow chart for a method implementing graphics hardware resource usage in a fully virtualized computing environment in accordance with exemplary embodiments.

FIG. 3 illustrates a flow chart for a method 300 implementing graphics hardware resource usage in a fully virtualized computing environment in accordance with exemplary embodiments. At step 305, a client interacts with an application running on the virtual machine 220 on the host 215 that is running generic hardware. In exemplary embodiments, the application may require advanced graphical hardware features that the host 215 does not possess. A request from the application for the advanced graphical hardware features is detected by the dummy driver 225 (e.g., a custom graphics library supporting Open GL or Direct3D/virtual 3D graphics driver). At step 310, the host machine 215, upon detection of the request, contacts the provisioning broker 245 (local or remote in the virtualized data center 210) and requests a migration of the virtual machine 220 to a host that can support the graphics requirements. At step 315, the provisioning broker 245 either finds an existing host (e.g., the second host 230) with suitable support or provisions a new host to meet the needs of the application. At step 320, the first host 215 migrates the virtual machine 220 to the second host 230. At the same time, the client 205 connection to the first host 215 is also transparently migrated to the second host 230. At Step 325, the migrated virtual machine 220 is started on the second host 230 as the second virtual machine 235. At step 330, the client 205 interacts with the application now running on the second host, until the application is finished with the graphics hardware requirements. At step 335, once the application requiring advanced graphics hardware has finished, the second host 230 contacts the provisioning broker 245 to find a suitable host for the virtual machine 235. At step 340, the provisioning broker 245 responds with a suitable host that is either newly provisioned or already extant (e.g., the first host 215). At step 345, the virtual machine 235 is migrated to, for example, the first host 215 with any active connections migrated. The virtual machine 220, now of the first host 215, for example, runs in the place most suited to its requirements. At step 350, the second host is then free to provide advanced hardware support in response to future needs as requested.

It is appreciated that the virtualized data center 210 is an infrastructure that includes a set of servers running virtual machines, some of the servers having real 3D Graphics hardware installed, other servers not running real hardware.

In order to implement the virtualized data center 210, the client 205 connects to the virtualized data center 210 and the application the client wishes to run are assigned for execution on one or more virtual machines, running on one or more servers (e.g., the first and second hosts 215, 230) inside the virtual data center 210.

When the client 205 uses an application running on a virtual machine (e.g., the virtual machine 220) inside one of the hosts (e.g., the first host 215), and the application invokes 3D accelerated functionality, the dummy driver 225 (e.g., custom graphics library and/or a virtual 3D graphics driver, that is, the software stack on the first host 215) triggers the migration of the virtual machine 220 towards a different host (e.g., the second host 230) inside the virtual data center 210 that has 3D graphics hardware installed, such that the application can run properly using accelerated 3D graphics. The client connections are routed to the second host 230 transparently, but the virtual machine (e.g., the virtual machine 220 migrated to the second host 230 as the virtual machine 235) containing the application runs on a different physical host (e.g., the second host 230). After the client 205 has finished using the application, based on specific heuristics, the virtual machine 235 that no longer requires 3D graphics acceleration is migrated back to the first host 215 without advanced 3D graphics hardware acceleration support.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. In a virtual data center having a first host and a second host, a graphics hardware resource usage method, comprising:
   receiving a request for graphics hardware features that are unavailable on the first host;
   generating a custom software stack configured to access the graphics hardware features;
   generating a first request to a provisioning broker to migrate a virtual machine residing on the first host to the second host having the graphics hardware features;
   migrating the virtual machine and a client connection to the second host;
   releasing the virtual machine and generating a second request to the provisioning broker to find a suitable host to which the virtual machine migrates back after the request for the graphics hardware features terminates;
   migrating the virtual machine to the suitable host, wherein the suitable host is the first host; and
   wherein the custom software stack resides on the virtual machine and is configured to intercept the request for the graphics hardware features and to migrate the virtual machine to the second host supporting the graphics hardware features.

2. The method as claimed in claim 1 wherein the request for the graphics hardware features is intercepted on a dummy graphics driver/library on the first host.

3. The method as claimed in claim 1 wherein the graphics hardware features are implemented by an application residing on the virtual machine.

4. The method as claimed in claim 3 wherein the application runs on the second host in response to the migration of the virtual machine to the second host.

5. The method as claimed in claim 3 wherein the first request is generated by the first host and the second request is generated by the second host.

6. A virtual data center system, comprising:
   a first host having a virtual machine;
   a second host;
   a provisioning broker communicatively coupled to the first host and the second host;
   a process for migrating the virtual machine between the first and second hosts, the process having instructions for:
   receiving a request for graphics hardware features that are unavailable on the first host;
   generating a custom software stack configured to access the graphics hardware features;
   generating a first request to the provisioning broker to migrate the virtual machine from the first host to the second host having the graphics hardware features;
   migrating the virtual machine and a client connection to the second host;

releasing the virtual machine and generating a second request to the provisioning broker to find a suitable host to which the virtual machine migrates back after the request for the graphics hardware features terminates;

migrating the virtual machine to the suitable host, wherein the suitable host is the first host; and wherein the custom software stack resides on the virtual machine and is configured to intercept the request for the graphics hardware features and to migrate the virtual machine to the second host supporting the graphics hardware features.

7. The system as claimed in claim 6 wherein the request for the graphics hardware features is intercepted on a dummy driver/library on the first host.

8. The system as claimed in claim 6 wherein the graphics hardware features are implemented by an application residing on the virtual machine.

9. The system as claimed in claim 8 wherein the application runs on the second host in response to the migration of the virtual machine to the second host.

10. The system as claimed in claim 8 wherein the first request is generated by the first host and the second request is generated by the second host.

11. A computer program product for providing graphics hardware resource usage in a virtual data center having a first host and a second host, the computer program product including a non-transitory computer readable medium having instructions for causing a computer to implement a method, the method comprising:

receiving a request for graphics hardware features that are unavailable on the first host;

generating a custom software stack configured to access the graphics hardware features;

generating a first request to a provisioning broker to migrate a virtual machine residing on the first host to the second host having the graphics hardware features;

migrating the virtual machine and a client connection to the second host;

releasing the virtual machine and generating a second request to the provisioning broker to find a suitable host to which the virtual machine migrates back after the request for the graphics hardware features terminates;

migrating the virtual machine to the suitable host, wherein the suitable host is the first host; and wherein the custom software stack resides on the virtual machine and is configured to intercept the request for the graphics hardware features and to migrate the virtual machine to the second host supporting the graphics hardware features.

12. The computer program product as claimed in claim 11 wherein the request for the graphics hardware features is intercepted on a dummy graphics driver/library on the first host.

13. The computer program product as claimed in claim 11 wherein the graphics hardware features are implemented by an application residing on the virtual machine.

14. The computer program product as claimed in claim 13 wherein the application runs on the second host in response to the migration of the virtual machine to the second host.

15. The computer program product as claimed in claim 13 wherein the first request is generated by the first host and the second request is generated by the second host.

* * * * *